US006732432B2

United States Patent
Foster et al.

(10) Patent No.: US 6,732,432 B2
(45) Date of Patent: May 11, 2004

(54) APPARATUS AND METHOD FOR FORMING AN EXHAUST EMISSION CONTROL DEVICE, AND THE DEVICE FORMED THEREBY

(75) Inventors: Michael R. Foster, Columbiaville, MI (US); Stephen J. Myers, Owosso, MI (US)

(73) Assignee: Delphi Technologies, Inc., Troy, MI (US)

( * ) Notice: Subject to any disclaimer, the term of this patent is extended or adjusted under 35 U.S.C. 154(b) by 14 days.

(21) Appl. No.: 09/997,755

(22) Filed: Nov. 30, 2001

(65) Prior Publication Data
US 2003/0103876 A1 Jun. 5, 2003

(51) Int. Cl.⁷ .................................................. B23P 15/00
(52) U.S. Cl. ............................. 29/890; 29/515; 29/523; 29/840.08
(58) Field of Search .......................... 29/890, 505, 515, 29/523, 590.08; 422/180, 177

(56) References Cited

U.S. PATENT DOCUMENTS

| | | | | |
|---|---|---|---|---|
| 5,909,916 A | * | 6/1999 | Foster et al. | 29/890 |
| 6,001,314 A | * | 12/1999 | Buck et al. | 422/177 |
| 6,029,488 A | * | 2/2000 | Wieres | 72/146 |
| 6,049,961 A | * | 4/2000 | Wieres | 29/505 |
| 6,049,980 A | * | 4/2000 | Wieres | 29/890 |
| 6,158,120 A | * | 12/2000 | Foster et al. | 29/890 |
| 6,299,843 B1 | * | 10/2001 | Locker et al. | 422/179 |
| 6,371,360 B1 | * | 4/2002 | Maus et al. | 228/181 |
| 6,381,843 B1 | * | 5/2002 | Irie et al. | 29/890 |
| 6,389,693 B1 | * | 5/2002 | Aranda et al. | 29/890 |
| 6,467,169 B1 | * | 10/2002 | Wieres | 29/890 |
| 6,497,039 B1 | * | 12/2002 | Wieres et al. | 29/890 |
| 6,505,396 B1 | * | 1/2003 | Wieres | 29/700 |
| 6,532,659 B1 | * | 3/2003 | DeSousa et al. | 29/890 |
| 2002/0068025 A1 | * | 6/2002 | Foster et al. | 422/179 |
| 2002/0095787 A1 | * | 7/2002 | Irie et al. | 29/890 |
| 2002/0141907 A1 | * | 10/2002 | Myers | 422/168 |
| 2002/0150518 A1 | * | 10/2002 | Brush et al. | 422/180 |
| 2003/0000088 A1 | * | 1/2003 | Mayfield | 29/890 |

FOREIGN PATENT DOCUMENTS

JP        11303627        11/1999

* cited by examiner

Primary Examiner—I Cuda Rosenbaum
(74) Attorney, Agent, or Firm—Paul L. Marshall

(57) ABSTRACT

Disclosed herein is an apparatus and method for manufacturing an exhaust emission control device, and the exhaust emission control device formed thereby. The method of manufacturing an exhaust emission control device, comprises: disposing a viscous-elastic material around at least a portion of a substrate to form a wrapped element. The wrapped element is compressed at a first compression rate and at a second compression rate that is slower than the first compression rate, and the wrapped element is introduced into a housing.

7 Claims, 7 Drawing Sheets

APPARATUS AND METHOD FOR FORMING AN EXHAUST EMISSION CONTROL DEVICE, AND THE DEVICE FORMED THEREBY

BACKGROUND

This disclosure relates to exhaust emission control devices. More particularly, this disclosure relates to methods and apparatus for forming exhaust emission control devices.

The removal of emissions, such as hydrocarbon, carbon monoxide, nitrogen oxide, particulate matter, and the like, from the exhaust gases of internal combustion engines is required for cleaner operating vehicles. One focus area for such exhaust emission reduction has been in the area of post combustion treatment. Namely, post combustion treatment includes the placement of one or more exhaust emission control devices in the exhaust down stream of the internal combustion engine. Such exhaust emission control devices include catalytic converters, catalytic absorbers, diesel particulate traps, non-thermal plasma conversion devices, and the like.

Many exhaust emission control devices comprise a frangible or fragile structure that is prone to crushing and damage in the exhaust environment. For example, exhaust emission control devices have used a substrate, commonly made of ceramic (e.g., cordierite, carbon, and the like), with a high surface area for exposing the substrate to the exhaust gas. In the example where exhaust emission control device is a catalytic converter, the substrate has a catalytically active material supported thereon.

The substrate is often retained in the exhaust pipe housing by means of a retention material or mat. The retention material is adapted to retain the substrate in a housing and to seal the gap between the substrate and the housing to force the exhaust gas through the cellular structure of the substrate.

SUMMARY

Disclosed herein is an apparatus and method for manufacturing an exhaust emission control device, and the exhaust emission control device formed thereby. The method of manufacturing an exhaust emission control device comprises: disposing a viscous-elastic material around at least a portion of a substrate to form a wrapped element. The wrapped element is compressed at a first compression rate and at a second compression rate that is slower than the first compression rate, and the wrapped element is introduced into a housing. Also disclosed is the exhaust emission control device formed by this method.

The apparatus for forming an exhaust emission control device comprises: a stuffing device having a conical portion comprising a first end, a transition point, and a second end. The first end has a first inner dimension. The transition point has a second inner dimension smaller than the first inner dimension, while the second end has a third inner dimension smaller than the second inner dimension and approximately equal to or smaller than the inner dimension of the housing. In addition, a first angle from the first end to the transition point is greater than a second angle from the transition point to the second end, and the second angle is greater than 0°.

The above-described and other features are appreciated and understood by those skilled in the art from the following detailed description, drawings, and appended claims.

BRIEF DESCRIPTION OF THE DRAWINGS

Referring now to the figures, where like elements are numbered alike.

DESCRIPTION OF THE PREFERRED EMBODIMENT

Figure 2:
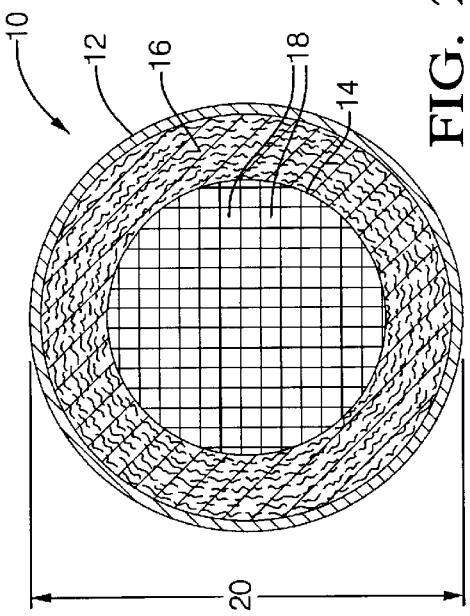
FIG. 2 is a cross sectional view of the exhaust emission control device of FIG. 1, taken along lines 2—2.
Figure 1:
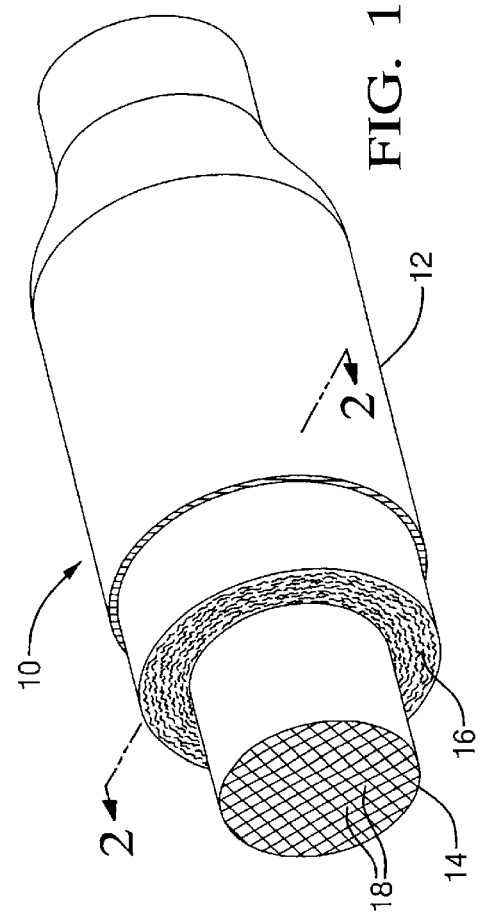
FIG. 1 is a partially cut-away perspective view of an exhaust emission control device.

Referring now to FIGS. 1 and 2, an exhaust emission control device 10 is illustrated. By way of example, device 10 is a catalytic converter, an absorber (and/or adsorber), a diesel particulate trap, a non-thermal plasma converter, and the like, as well as combinations thereof.

Device 10 includes an outer housing 12, a substrate 14, and a retention material 16. Device 10 is placed in the exhaust stream after the internal combustion engine of a vehicle (not shown) such that the exhaust gas passes through substrate 14. Substrate 14 can comprise a catalyst. The substrate 14 itself and/or active materials thereon reduce, convert, trap, and/or eliminate one or more emissions from the exhaust stream. Substrate 14 can have a frangible or fragile structure that includes a plurality of cells or passages 18 for the exhaust gas and increases the surface area of the substrate. Substrate 14 comprises silicon carbide (SiC), cordierite, metal, metal oxide (e.g., aluminum oxide, and the like), porous glass, carbon, and the like, as well as combinations thereof. Substrate 14 is illustrated by way of example as having cells 18. Of course, substrate 14 having alternate substrate designs such as, but not limited to, honeycomb shapes (e.g., rounded, polygonal), foils, sponges, and the like, as well as combinations thereof are considered within the scope of this disclosure.

In use, exhaust emission control device 10 is subjected to a large range of temperatures and vibrations. Accordingly, the retention force or pressure (hereinafter force) placed on substrate 14 by retention material 16 is preferably sufficient to successfully hold the substrate and insulate it from shock and vibration. Retention material 16 provides the retention force to substrate 14 and preferably acts as a barrier in the space between dimension 20 and substrate 14 to ensure that the exhaust gas passes through cells 18.

Retention material 16, which is concentrically disposed around substrate 14, comprises either an intumescent material (e.g., comprising a vermiculite component), a non-intumescent material, or a combination thereof. The intumescent material, for example, is one which comprises ceramic materials, and other materials such as organic binders and the like, or combinations comprising at least one of the foregoing materials. The vermiculite component is a component that expands with heating to maintain firm uniform compression, or non-uniform compression, if desired. The non-intumescent material, for example, is one that does not contain vermiculite. Non-intumescent materials include materials such as 900 HT, 1100 HT, and those sold under the trademarks "NEXTEL" and "SAFFIL" by the "3M" Company, Minneapolis, Minn., or those sold under the trademark, "FIBERFRAX" and "CC-MAX" by the Unifrax Co., Niagara Falls, N.Y., and the like. Intumescent materials include materials, sold under the trademark "INTERAM" by the "3M" Company, Minneapolis, Minn., such as Interam 100, as well as those intumescents which are also sold under the aforementioned "FIBERFRAX" trademark by the Unifrax Co., Niagara Falls, N.Y., as well as combinations comprising at least one of the foregoing materials, and others.

Figure 3:
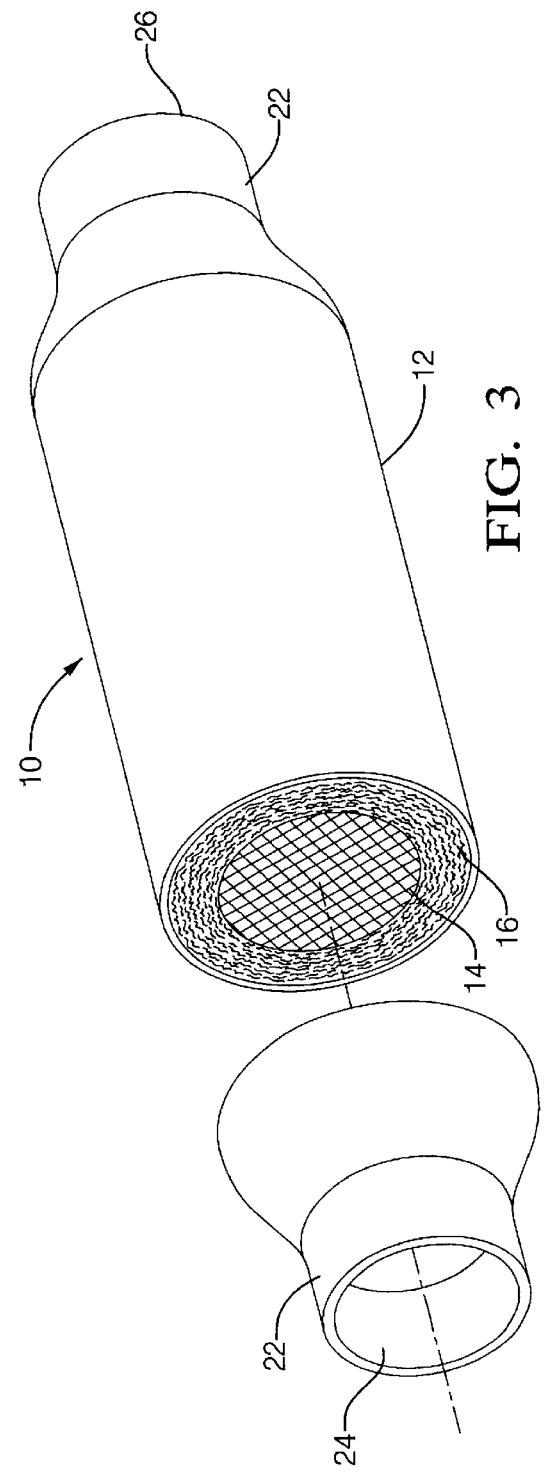
FIG. 3 is an exploded perspective view of an exhaust emission control device having end cones.

Referring to FIG. 3, housing 12 includes an end cone or plate 22 (hereinafter "end cone") at an inlet end 24 and at an outlet end 26 of device 10. End cones 22 are adapted to be connected to an exhaust pipe (not shown) of the vehicle. Accordingly, end cones 22 are fluidly connected to the exhaust pipe such that the openings of cells 18 are aligned with the flow of the exhaust gas.

The choice of material for housing 12 and/or end cones 24 depends upon the type of exhaust gas, the maximum temperature reached by device 10, the maximum temperature of the exhaust gas stream, and the like. Suitable materials for housing 12 and/or end cones 24 include any material that is capable of resisting under-car salt, temperature and corrosion. Typically, ferrous materials are employed such as ferritic stainless steels. Ferritic stainless steels include stainless steels such as, e.g., the 400—Series such as SS-409, SS-439, and SS-441, with grade SS-409 generally preferred.

Figure 4:
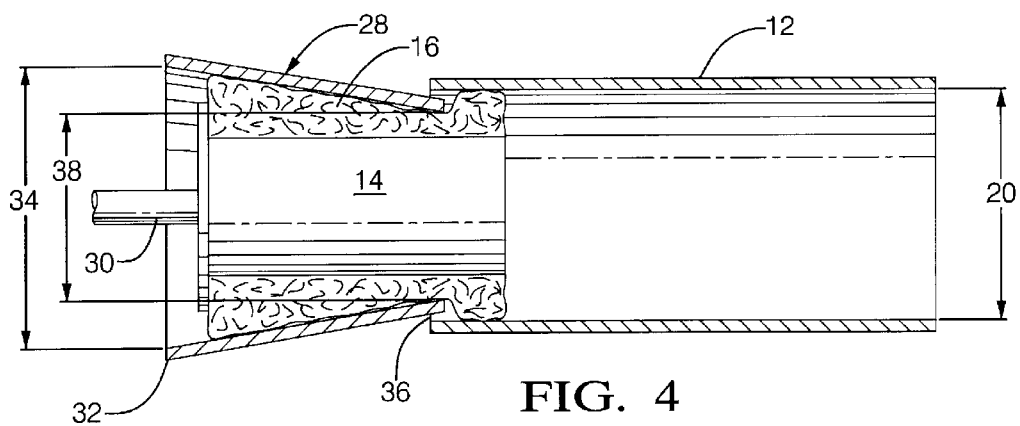
FIG. 4 is a cross sectional view of a loading or stuffing method for an exhaust emission control device.

During assembly, substrate 14 is wrapped with retention material 16 and is inserted into housing 12 through one of the open ends of the housing before end cone 22 is connected to the housing. This method is commonly referred to as the "loading" or "stuffing" method. The loading method is described in more detail with reference to FIG. 4. Here, a cone 28 and a ram 30 are used to urge substrate 14 wrapped with retention material 16 into housing 12. Cone (or stuffing device) 28 can have a frustoconical shape with a first end 32 having a first inner dimension 34, and a second end 36 having a second, smaller inner dimension 38. Optionally, the cone 28 can have a cylindrical portion at one or both ends (not shown). As shown, second inner dimension 38 is at least equal to, if not smaller than housing inner dimension 20 of housing 12, and cone 28 has a substantially linear taper from first inner dimension 34 to second inner dimension 38.

Substrate 14 wrapped with retention material 16 is placed into cone 28 at first end 32. Ram 30 is configured to push wrapped substrate 14 through cone 28 from first end 32 towards second end 36, and into housing 12. Thus, cone 28 is used to radially compress material 16 about the substrate 14 during the loading process. The rate of the radial compression of retention material 16 is referred to herein as the closing or closure rate.

More specifically, cone 28 is used to radially compress or close retention material 16 at least to housing inner dimension 20 of housing 12 (e.g., where a cone inner dimension 38 is equal to or smaller than housing inner dimension 20). In other instances, the cone 28 is used to compress retention material 16 to slightly greater than the inner dimension (e.g., where second inner dimension 38 is greater than housing inner dimension 20). Once retention material 16 is loaded into housing 12, it contacts the inner surface of the housing 12, thus supporting substrate 14 in the housing 12. The density of the retention material 16 once loaded into housing 12 is commonly referred to as the mount density.

The closing rate is a function of the speed with which ram 30 inserts substrate 14 into housing 12, and a function of the taper of cone 28. As discussed above with respect to FIG. 4, cone 28 has a linear taper from first inner dimension 34 to second inner dimension 38. Thus, with a constant feed rate of ram 30 and a linear taper in cone 28, the closing rate of retention material 16 is also constant.

The radial compression or closure of retention material 16 exerts a retention force on substrate 12. In the past, the retention force available from loading methods had been reliable to secure substrates 14 in housing 12. However, efforts to increase the surface area of substrates 14 and/or improve the performance of the substrate have led to a decrease in the strength of the substrates. For example, where substrate 14 comprises a catalytic material, it is desired for such catalyst substrates to warn-up to operating temperature quickly (i.e., catalyst light off temperature) in order to meet the increasingly stringent emission standards. The ability for catalyst substrates to warm-up is related to the mass of the substrate multiplied by the specific heat of material. Catalyst warm-up rate has been reduced by reducing the mass, or thickness of the walls of the substrate. The decreased wall thickness equates to decreased substrate structural integrity. Consequently, loading the substrate 14 into the housing 12 can cause crushing or damage to the substrate. Essentially, reducing the thickness of the walls of substrate 14 has reduced the force at which damage occurs to the substrate.

In an effort to reduce damage to such thinner walled or higher surface area substrates 14, careful study of the insertion of the substrate into housing 12 has been made. It has been found that substrate 14 is often exposed to its highest or maximum retention force during loading or assembly into housing 12. Often, this maximum retention force is sufficient to damage or even crush substrate 14. For purposes of clarity, the retention force exerted by retention material 16 on substrate 14 during assembly or loading is referred to herein as "a dynamic retention force". In contrast, the retention force exerted by retention material 16 after assembly or loading is referred to herein as "a static retention force". The highest retention force exerted by retention material 16 on substrate 14 is referred to herein as "a maximum retention force".

It has been discovered that the closure rate applied to retention material 16 affects the maximum retention force exerted on substrate 14, due to the dilatant or viscous-elastic properties of the material. By dilatant or viscous-elastic properties, we mean a material that has a non-resilient deformation when subjected to slow, steady-state stress, and a highly resilient resistance to deformation when subjected to rapid shock-like stresses.

Additionally, the viscous-elastic material properties of retention material 16 also tends to decrease or relax the dynamic retention force to a lower, relaxed or static retention force after a reduction in the closing rate. The amount of relaxation after the dynamic retention force is applied also varies depending on the closing rate.

For example, if the retention material 16 is inserted into housing 12 at a first closure rate, a first dynamic retention force is attained. In contrast, if the retention material 16 is inserted into the housing 12 at a second, slower closure rate, a second, lower dynamic retention force is attained. In other words, when a slower closure rate is employed, the retention material 16 applies a lower dynamic retention force on substrate 14, which results in a lower maximum retention force. For example, referring to FIG. 5, the dynamic retention force exerted on substrate 14 by retention material 16 is illustrated during three different closing rates, namely 60 inches/minute, 12 inches/minute, and 1 inch/minute. In this example, retention material 16 is a vermiculate type material known as Interam 100, commercially available from the Minnesota, Manufacturing, and Mining Company.

Figure 5:
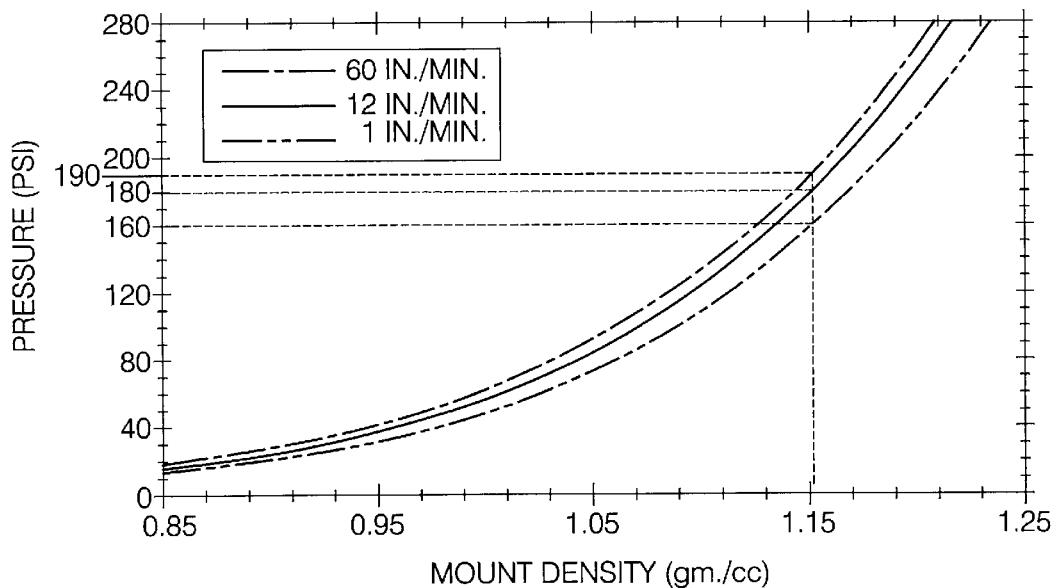
FIG. 5 is a graph of a dynamic retention force applied by a retention material as a function of the closure rate.

It is seen from FIG. 5 that the faster the closing rate, the higher the maximum retention force exerted on substrate 14 by retention material 16. By way of example, a comparison of the maximum retention forces exerted during the compression or closing of material 16 to a density of 1.15 gm/cc (grams per cubic centimeter) is provided below. Here, retention material 16 exerts a maximum retention force of about 190 psi (pounds per square inch) with a closing rate of 60 inches/minute. However, retention material 16 exerts a maximum retention force of about 180 psi with a closing rate of 12 inches/minute, but exerts a maximum retention force of only about 160 psi with a closing rate of 1 inch/minute.

Figure 6:
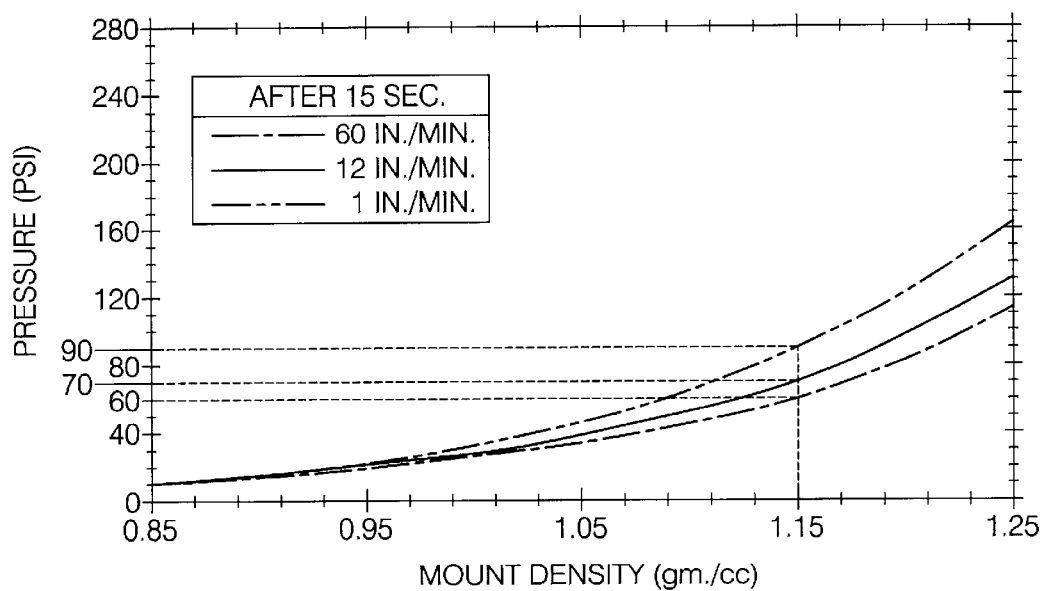
FIG. 6 is a graph of a static retention force applied by the retention material of FIG. 5 as a function of the closure rate.

Referring now to FIG. 6, the static retention force exerted on substrate 14 by retention material 16 is illustrated with the same three closing rates illustrated in FIG. 5, namely 60 inches/minute, 12 inches/minute, and 1 inch/minute. Here, the static retention force was measured fifteen seconds after substrate 14 was loaded into housing 12. It is seen that the faster the closing rate, the greater the relaxation from to the static retention force. For example, at a mount density of 1.15 gm/cc, retention material 16 exerts a static retention force of about 60 psi after a closing rate of 60 inches/minute, e.g., decreasing from a maximum of 190 psi (a 130 psi change). However, retention material 16 exerts a static retention force of about 80 psi after a closing rate of 12 inches/minute, e.g., decreasing from a maximum of 180 psi (a 100 psi change). Finally, retention material 16 exerts a static retention force of over 90 psi after a closing rate of 1 inch/minute, e.g., decreasing from a maximum of 160 psi (a less than about 70 psi change).

Figure 7:
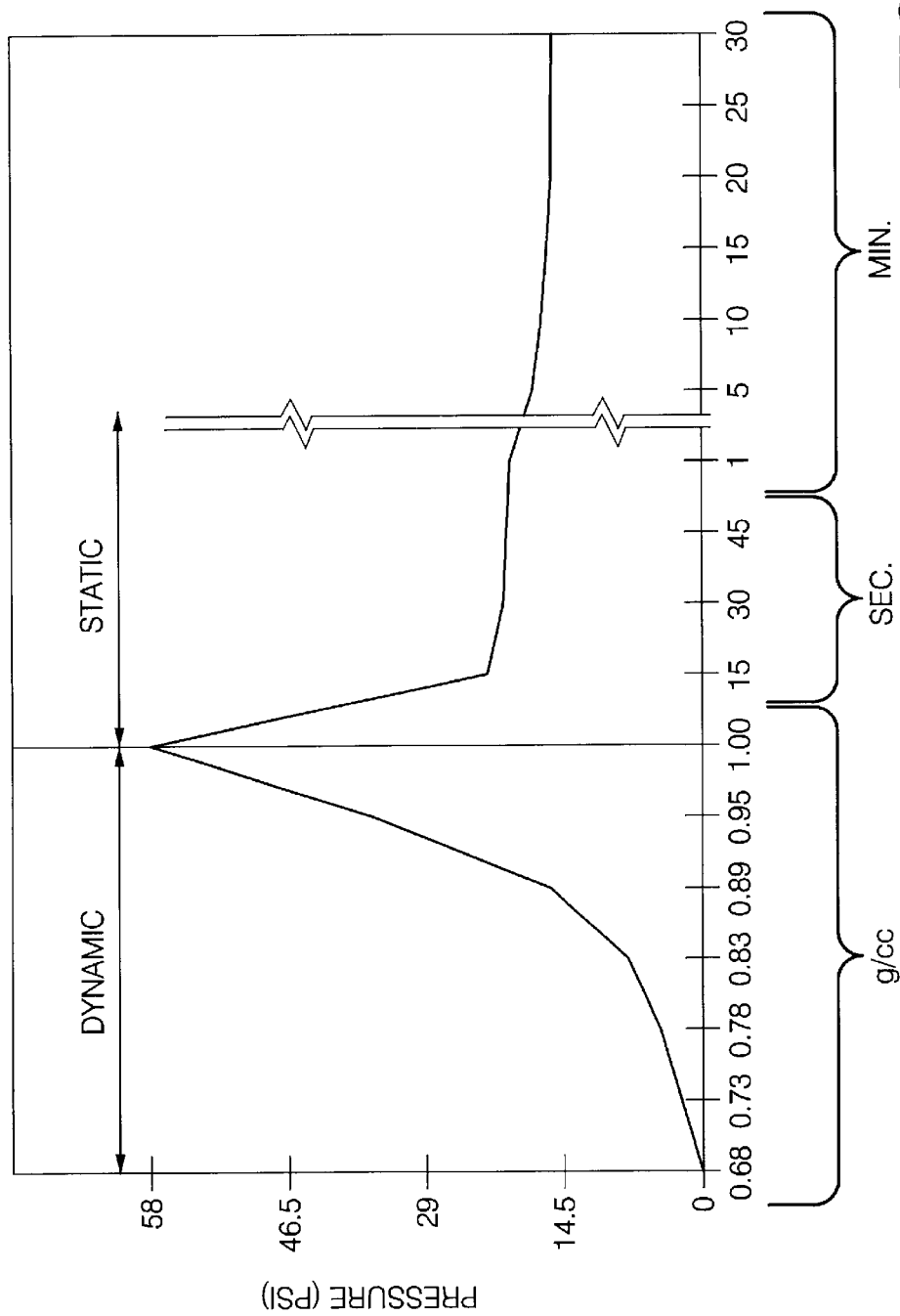
FIG. 7 is a graph of a dynamic retention force as a function of the closure rate and the resulting static retention force applied by the retention material as a function of time.

Turning now to FIG. 7, a further illustration of the viscous-elastic properties of retention material 16 as a function of the closing rate is shown. Here, ram 30 has a constant closing rate of 12 inches/minute to close retention material 16 from an initial density of 0.68 gm/cc to 1.00 gm/cc. In this example, second inner dimension 38 of stuffing cone 28 is equal to housing inner dimension 20 of housing 12. Thus after being stuffed into housing 12, retention material 16 is held at a density of 1.00 gm/cc by housing inner dimension 20. The dynamic retention force is shown during the compression or closing of retention material 16, and the static retention force is shown after the closing for a total of thirty minutes. It can be seen from this example that substantially all of the relaxation of the maximum retention force exerted on substrate 14 occurs within the first fifteen seconds after the substrate is loaded in housing 12. It can also be seen that the dynamic retention force is equal to the maximum retention force when the closing rate is held constant.

Accordingly, a lower maximum retention force is exerted on substrate 14 by retention material 16 at slower closing rates. Additionally, at these slower closing rates the static retention force is maintained closer to the maximum retention force after a nominal relaxation period (e.g. fifteen seconds). Thus, substrates 14 loaded with a slower closing rate on viscous-elastic retention material 16 are capable of being loaded to a higher mount density prior to reaching a maximum retention force that damages the substrate. A reduction in the closing rate can be obtained in various fashions, including: reducing the feed rate of ram 30, decreasing the angle of taper of stuffing cone 28, as well as combinations of these fashions. However, reducing the feed rate of ram 30 slows down the assembly process of device 10. Similarly, decreasing the taper of stuffing cone 28 requires retooling of current manufacturing equipment and rams 30. Both solutions therefore, would increase the cost to assemble device 10.

Figure 8:
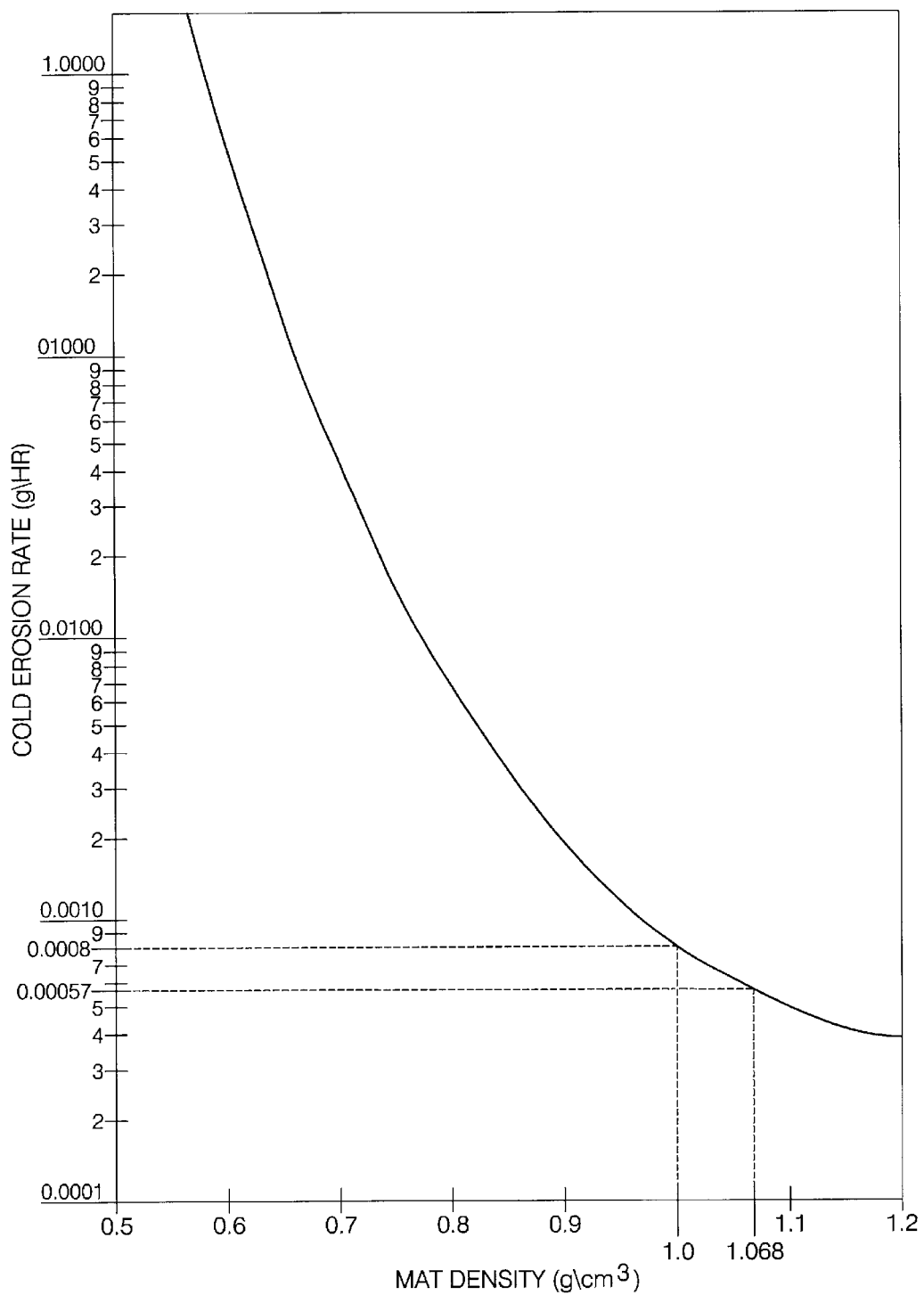
FIG. 8 is a graph of the erosion rate of a retention material as a function of the mount density of the material.

Another issue that should be considered when forming an exhaust emission control device is the affect of the exhaust gas on the retention material 16. The exhaust gas has a tendency to erode and/or degrade the retention material 16, with the erosion rate being a function of the mount density. More specifically and with reference to FIG. 8, the erosion rate increases logarithmically as a function of the mount density of retention material 16. For example, retention material 16 erodes at a rate of 0.0008 grams/hour at a mount density of 1.0 gm/cc. However, retention material 16 erodes at a rate of 0.00057 grams/hour at a mount density of 1.068 gm/cc. Thus, an increase in the mount density of only about 7% produces a corresponding reduction in the erosion rate of about 29%.

It has been determined that the rapid reduction in the static retention force that occurs after a relatively fast closing rate is useful in reducing the maximum retention force exerted on substrate 14. It has also been determined that reduction of the maximum retention force exerted on substrate 14 is achieved even with an increase in the mount density of retention material 16, which therefore reduces erosion of the retention material. More specifically, it has been determined that a variable closing rate, namely one that reduces during the closure of retention material 16, is desired to make use of the viscous-elastic properties of the retention material. Exemplary embodiments of such variable closing rates are provided in FIGS. 9–12 where elements having similar or analogous functions are numbered in multiples of one hundred.

Figure 9:
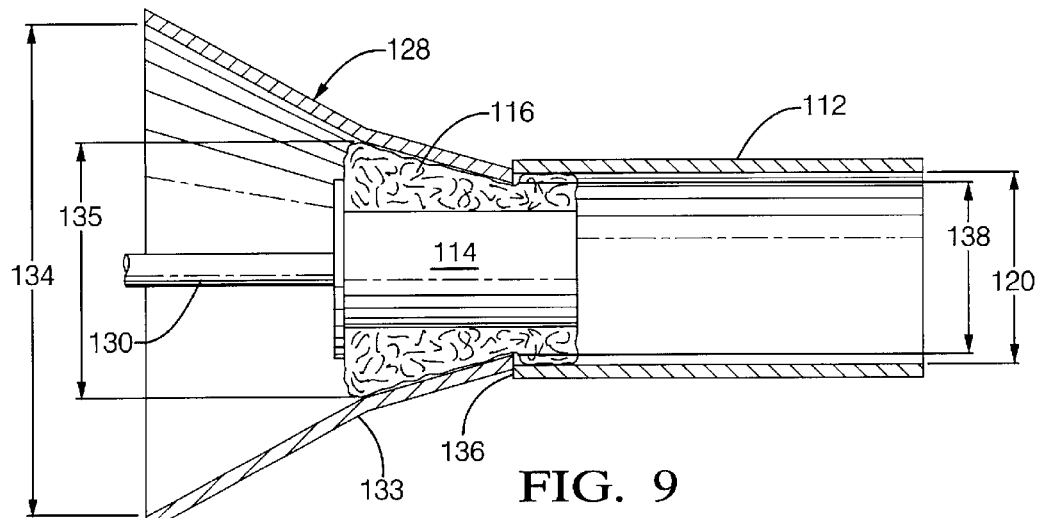
FIG. 9 is a sectional view of an exemplary embodiment of a variable closure rate.
Figure 10:
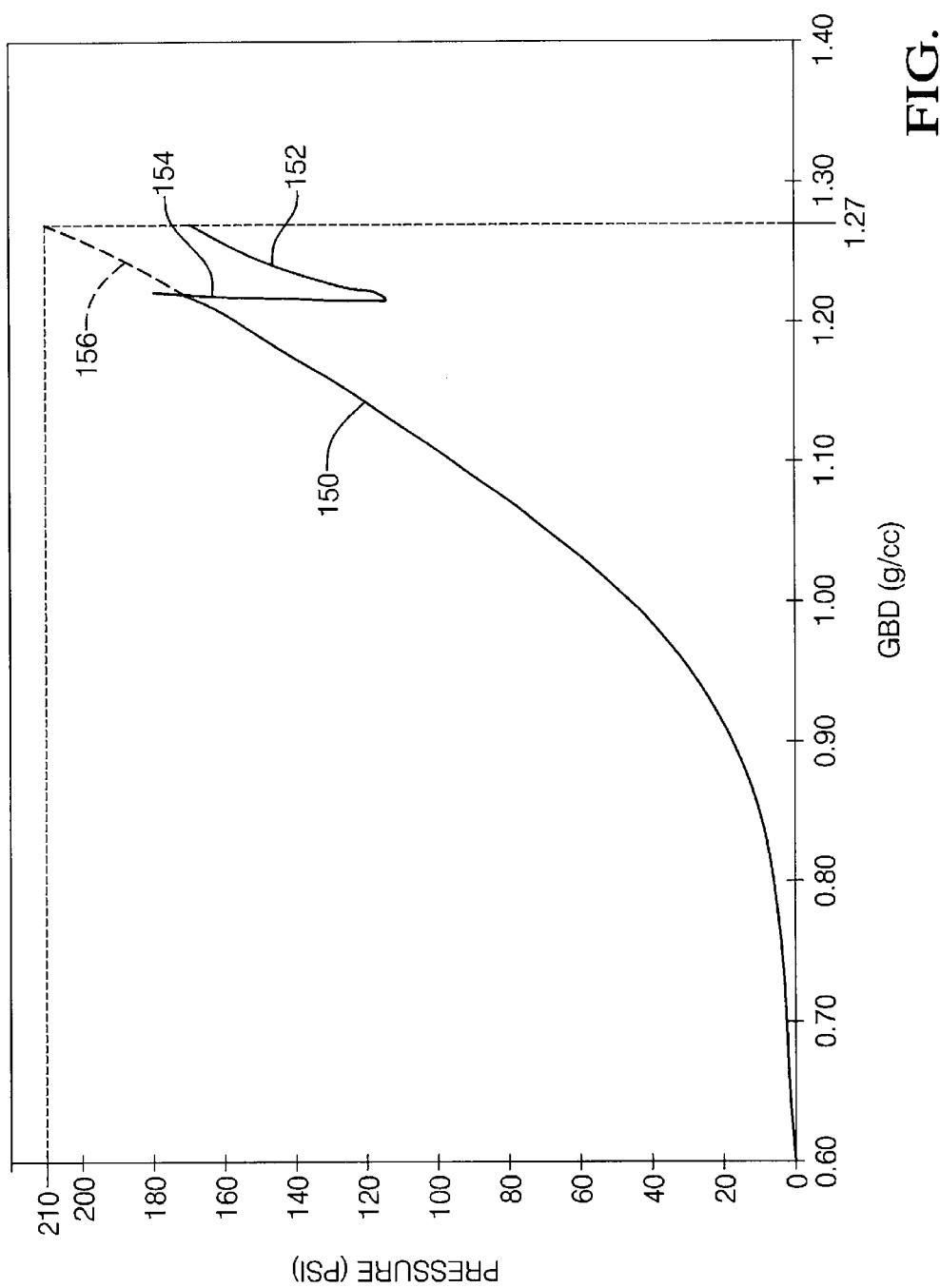
FIG. 10 is a graph illustrating the retention force exerted on the substrate by the method and device of sectional view of FIG. 9.

A first exemplary embodiment of a variable closing rate is illustrated in FIGS. 9 and 10. Stuffing cone 128 has a first end 132 having a first inner dimension 134, and a second end 136 having a second, smaller dimension 138. As shown, second inner dimension 138 is at least equal to, if not smaller than inner dimension 120 of housing 112. Stuffing cone 128 also has a transition point 133 having an inner dimension 135. Here, cone 128 has a first substantially linear taper from first inner dimension 134 to the transition point's inner dimension 135, and a second substantially linear taper from the transition point's inner dimension 135 to second inner dimension 138. Thus, cone 128 is configured to apply a first, faster closure rate to retention material 116 with the first substantially linear taper, and is configured to apply a second, slower closure rate to the retention material with the second substantially linear taper. Accordingly, cone 128 is configured to apply a first dynamic retention force 150 to substrate 114 from first end 132 to transition point 133, and a second, lower dynamic retention force 152 from the transition point to second end 136.

Substrate 114 wrapped with retention material 116 is placed into cone 128 at first end 132. Ram 130 is configured to push wrapped substrate 114 through cone 128 from first end 132 towards second end 138, and into housing 112. Thus, stuffing cone 128 is used to radially compress or close retention material 116 during the stuffing process. Here, a variable closing rate is obtained without increasing the time to manufacture device 110 and without retooling current manufacturing equipment and rams 130. More specifically, a first closing rate is applied to retention material 116 by cone 128 between first end 132 and transition point 133, which applies first dynamic retention force 150 on substrate 114. Next, a second, slower closing rate is applied to retention material 116 by cone 128 between transition point 133 and second end 136, which results in a second, lower, dynamic retention force 152 on substrate 114.

Retention material 116, upon the change in closing rates, relaxes and reduces from first dynamic retention force 150 due to its viscous-elastic properties. While this relaxation is occurring, cone 128 is applying the second dynamic retention force 152. However, no increase in the maximum retention force is applied to substrate 114 because as the second dynamic retention force 152 is applied, the first dynamic retention force 150 is relaxing along line 154.

For example, ram 130 is configured to urge substrate 114 wrapped with retention material 116 through cone 128 and into housing 112. The taper of cone 128 between first end 132 and transition point 133 is configured to apply a first closure rate of 5.75 mm/sec (e.g., 13.6 inches/minute), which applies a first dynamic retention force 150 on substrate 114. In this example, the thickness of retention material 116 at inner dimension 134 of first end 132 of cone 128 is approximately 9.65 mm. Ram 130 urges substrate 114 through cone 128 toward housing 112 until retention material 116 has reached transition point 133. Here, retention material 116 at transition point 133 has a density of 1.20 gm/cc, at an inner dimension 135 of approximately 5.166 mm. At this point, the taper of cone 128 between transition point 133 and second end 136 is configured to apply a second, slower closure rate of 0.49 mm/sec (e.g., 1.2 inches/minute), which applies a second, lower dynamic retention force 152 on substrate 114. Here, the thickness of retention material 116 at second inner dimension 138 is approximately 4.88 mm, and the second inner dimension is substantially equal to inner dimension 120 of housing 112. By slowing the closure rate from the first to the second closure rate at transition point 133, retention material 116 relaxes and reduces along line 154 from first dynamic retention force 150 due to its viscous-elastic properties.

Simultaneously with relation 154, ram 130 completes the urging of substrate 114 into housing 112, at which point retention material 116 has a mount density of 1.27 gm/cc. It is seen from FIG. 10 that the maximum retention force applied to substrate 114 occurs at transition point 133, namely about 180 psi. During the relaxation 154 of retention material 116 due to the decrease in the closing rate after transition point 133, the maximum retention force applied substrate 114 never exceeds the 180 psi level. This is true even though retention material 116 continues to be compressed or closed from 1.20 gm/cc to 1.27 gm/cc by cone 128 between transition point 133 and inner dimension 120. By way of comparison, application of first dynamic retention force 150 to compress or close retention material 116 to 1.27 gm/cc by way of a cone without transition point 133 is illustrated in phantom as line 156 (e.g., an extrapolation of first dynamic retention force 150). Here, it is seen that using the variable closure rate provided by cone 128, a maximum retention force of 180 psi is applied to substrate 114 to achieve the mount density of 1.27 gm/cc. However, using non-variable closure rate illustrated by line 156, a maximum retention force of more than 210 psi is applied to substrate 114 to achieve the same mount density of 1.27 gm/cc. More specifically, it is seen in this example that the maximum retention force is equal to the first dynamic retention force when the closing rate is decreased during assembly.

Figure 11:
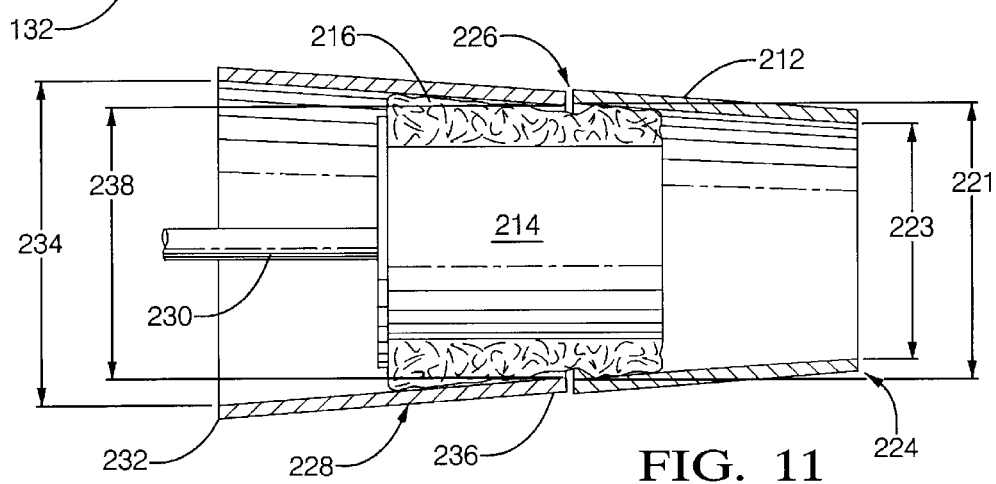
FIG. 11 is a sectional view of an alternate exemplary embodiment of a variable closure rate.
Figure 12:
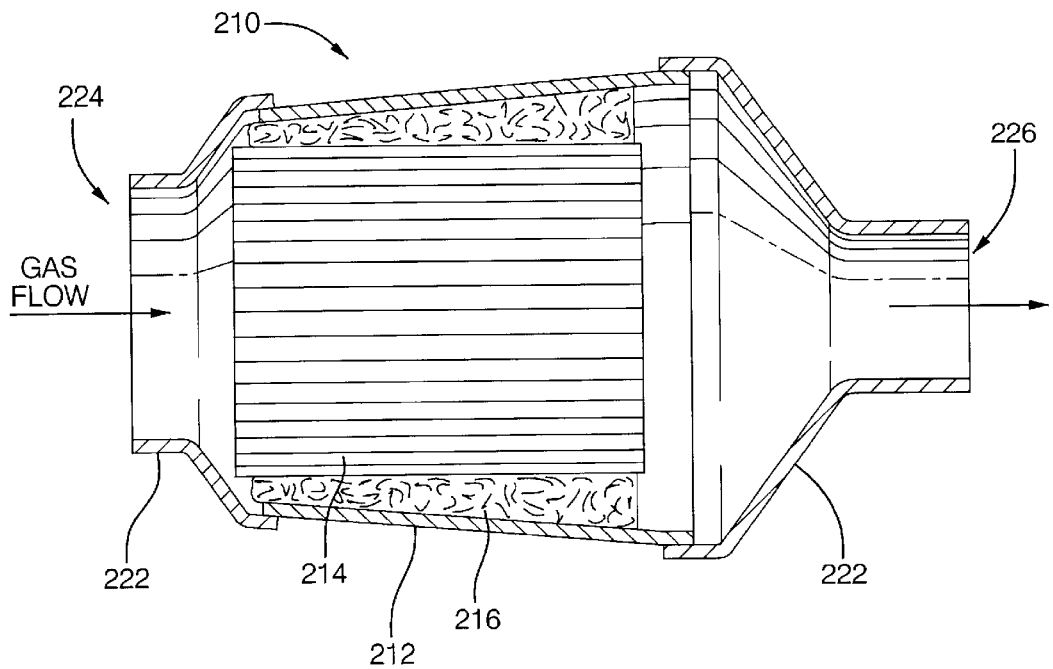
FIG. 12 is a sectional view of an exemplary embodiment of an exhaust emission control device formed by the device and method of FIG. 11.

Another exemplary embodiment of a variable closing rate is illustrated in FIGS. 11 and 12. In this embodiment, housing 212 has a linear taper that decreases from inner dimension 221 of outlet side 226 to inner dimension 223 at inlet side 224. Thus, housing 212 has a first inner dimension 221 at outlet side 226, and a second, smaller inner dimension 223 at inlet side 224. By way of example, first inner dimension 221 is about 0.25 to about 0.30 mm (millimeters) larger than a second inner dimension 223.

Stuffing cone 228 has a first end 232 having a first inner dimension 234, and a second end 236 having a second, smaller dimension 238. As shown, second inner dimension 238 is at least equal to, if not smaller than, inner dimension 221 of housing 212. Stuffing cone 228 also has a substantially linear taper from first inner dimension 234 to second inner dimension 238.

During assembly, substrate 214 wrapped with retention material 216 is placed within inner dimension 234 of first end 232 of stuffing cone 228. Second end 236 of stuffing cone 228 is placed adjacent to outlet side 226 of housing 212. Then, ram 230 urges substrate 214 through stuffing cone 228 into housing 212 through the outlet side 226 of the housing at a constant feed rate.

As seen in FIG. 11, the degree of the taper of housing 212 (e.g., from inner dimension 221 to inner dimension 223) is less than the degree of the taper of cone 228 (e.g., from inner dimension 234 to inner dimension 238), with the degree of taper being greater than zero degrees. Accordingly, cone 228 is configured to apply a first closing rate to retention material 216, while housing 212 is configured to apply a second, slower closing rate to the retention material.

Thus, both stuffing cone 228 and housing 212 are used to radially compress or close retention material 216 during the stuffing process. More specifically, stuffing cone 228 is used to radially compress or close retention material 216 from inner dimension 234 to inner dimension 238 at a first closing rate due to the taper of the stuffing cone. However, housing 212 is used to radially compress or close retention material 216 from inner dimension 221 to inner dimension 223 at a second, slower, closing rate due to the smaller taper of the housing. In this manner, a variable closing rate is obtained without increasing the time to manufacture device 210 and without retooling current manufacturing equipment and rams 230. Thus, a fast closing rate is applied to retention material 216 by cone 228, which applies a first dynamic retention force on substrate 214. Next, a second, slower closing rate is applied to retention material 216 by housing 212, which applies a second, lower dynamic retention force on substrate 214.

As discussed in detail above, after the first closing rate has ended, retention material 216 relaxes and reduces from the first dynamic retention force due to its viscous-elastic properties. While this relaxation is occurring, the mount density continues to increase, and the retention material 216 is applying the second dynamic retention force. However, no increase in the maximum retention force is applied to substrate 214 because as the second dynamic retention force is applied, the first dynamic retention force is relaxing.

It has also been found that erosion occurs more rapidly at inlet side 224 of device 210, additionally as the mount density increases, the erosion decreases as described above with respect to FIG. 8. As also illustrated in device 210 of FIG. 12, retention material 216 has a higher mount density at inlet side 224 than at outlet side 226. The higher mount density at inlet side 224 is due to the fact that inner dimension 223 at the inlet side is smaller than the inner dimension 221 at outlet side 226. Accordingly, housing 212 not only reduces the maximum force applied to substrate 214, but also provides for reduced erosion of retention material 216.

Figure 13:
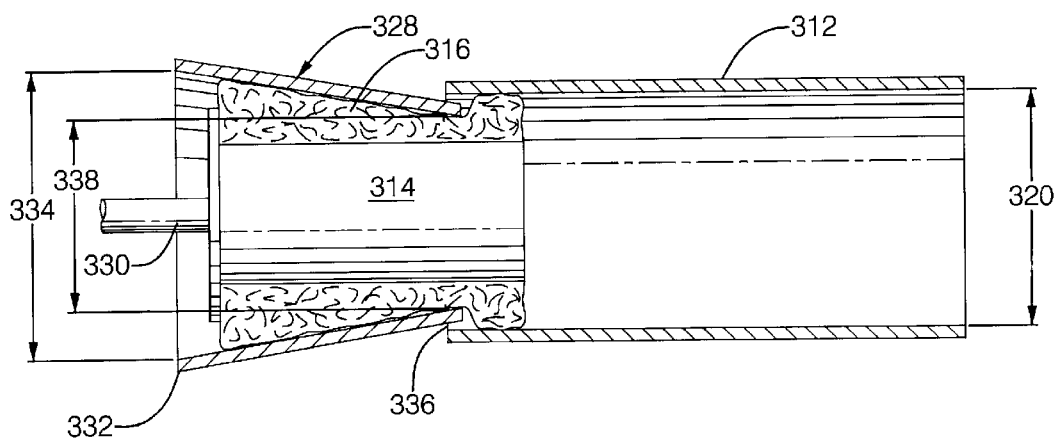
FIG. 13 is a sectional view of an alternate exemplary embodiment of a variable closure rate.

Yet another exemplary embodiment of a variable closing rate is illustrated in FIG. 13. Here, stuffing cone 328 and a ram 330 are used to urge substrate 314 wrapped with retention material 316 into housing 312. Stuffing cone 328 has a first end 332 having a first inner dimension 334, and a second end 336 having a second, smaller dimension 338. As shown, second inner dimension 338 is at least equal to, if not smaller than inner dimension 320 of housing 312, and stuffing cone 328 has a substantially linear taper from first inner dimension 234 to second inner dimension 338.

Substrate 314 wrapped with retention material 316 is placed into first end 332 of cone 328. Ram 330 is configured to push wrapped substrate 314 through cone 328 from first end 332 towards second end 338, and into housing 312 with a variable speed. More specifically, ram 130 is configured to urge substrate 314 into housing 312 initially at a first speed, and to decrease from that first speed to a slower speed at a selected point during the stuffing process. The selected point can be predetermined based upon the specific retention material, including its dimensions, and the dimensions of the substrate and stuffing cone. Alternatively, the selected point can be selected dynamically based upon the point at which a maximum desired dynamic retention force is attained.

For example, ram 330 is configured to slow from a first speed to a second, slower speed before the point where dynamic retention force exceeds a force that may crush substrate 314. By way of example, the first ram speed is about 50 to about 200 mm/sec, while the second ram speed is about 5 to about 20 mm/sec.

While ram 330 is urging substrate 314 into housing 312 at the first speed, a first closing rate is applied to retention material 316 due to the linear taper of cone 328. Thus, at the first ram speed retention material 316 is applying a first dynamic retention force on substrate 314. However, when ram 330 decreases its speed to the second speed, a second closing rate is applied to retention material 316 due to the linear taper of cone 328. Thus, at the second, slower ram speed retention material 316 is applying a second, lower dynamic retention force on substrate 314. Moreover, at the point of slow down, the first dynamic retention force relaxes and reduces due to the viscous-elastic properties of retention material 316. While this relaxation is occurring, the second dynamic retention force is being applied. However, no increase above the maximum retention force is applied to substrate 314 because as the second dynamic retention force is applied, the first dynamic retention force is relaxing.

It should be recognized that the housing, cone, and decreasing ram speed are described above as means for changing the retention force, by way of example only. Of course, the use of a housing having a nonlinear taper, the use of a stuffing cone having a non-linear taper, the use of a stuffing cone having more than one transition point, and the use of a ram that decreases in speed in a nonlinear manner can also be employed, as well as combinations of any of the disclosed methods for reducing the retention force.

As can seen from the examples described above, the relaxation of the maximum retention force that occurs after a relatively fast closing rate is useful in reducing the maximum dynamic retention force exerted on the substrate. Thus, a variable closing rate, however applied, makes full use of the viscous-elastic properties of the retention material to prevent crushing or damage to the substrate. Further, the variable closing rate can be obtained without increasing the time or cost to manufacture the exhaust emission control device and without retooling current manufacturing equipment and rams.

For purposes of clarity, the exhaust emission control device and/or housing are illustrated herein by way of example as having a circular cross section. Of course, use on non-circular cross sections, e.g., polygonal and/or rounded, such as ovoid, square, rectangular, parallelogram, and the like, as well as combinations comprising at least one of these shapes.

While the invention has been described with reference to one or more exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of manufacturing an exhaust emission control device, comprising:

disposing a viscous-elastic material around at least a portion of a substrate to form a wrapped element;

inserting the wrapped element in a first end of a stuffing device;

placing a second end of the stuffing device adjacent to an open end of the housing;

compressing the viscous-elastic material at first compression rate;

compressing the viscous-elastic material at a second compression rate that is slower than the first compression rate; and urging the wrapped element through the stuffing device into the open end;

wherein the stuffing device comprises a first taper proximate the first end, and a second taper proximate the first taper, the first taper has a larger angle than the second taper, and wherein the second taper has an angle greater or than 0°.

2. The method of claim 1, wherein the urging further comprises urging the wrapped element through the stuffing device at a substantially constant rate.

3. A method of manufacturing an exhaust emission control device, comprising:

disposing a viscous-elastic material around at least a portion of a substrate to form a wrapped element;

compressing the viscous-elastic material at a first compression rate;

compressing the viscous-elastic material at a second compression rate that is slower than the first compression rate;

monitoring a dynamic retention force of the visco-elastic material and changing from the first compression rate to the second compression rate when the dynamic retention force reaches a selected level; and introducing the wrapped element into a housing.

4. The method of claim 3, further comprising maintaining the dynamic retention force at or below the selected level.

5. A method of manufacturing an exhaust emission control device, comprising:

disposing a viscous-elastic material around at least a portion of a substrate to form a wrapped element;

compressing the viscous-elastic material at a first compression rate;

compressing the viscous-elastic material at a second compression rate that is slower than the first compression rate;

urging the wrapped element trough a stuffing device into the housing, wherein the stuffing device has a first taper and the housing has a second taper, wherein the first taper has a larger angle than the second taper, and wherein the second taper has an angle greater than 0°.

6. The method of claim 5, further comprising urging the wrapped element through the stuffing device at a substantially constant rate.

7. The method of claim 5, wherein the wrapped element is urged at a first ram speed of about 50 mm/sec to about 200 mm/sec, and a second ram speed of about 5 to about 20 mm/sec.

* * * * *